United States Patent [19]
Smith

[11] Patent Number: 5,139,299
[45] Date of Patent: Aug. 18, 1992

[54] COMPARTMENTED TRASH RECEPTACLE AND HOLDER ASSEMBLY

[76] Inventor: Judith A. Smith, 711 Tarry Town Tr., Port Orange, Fla. 32127

[21] Appl. No.: 681,472

[22] Filed: Apr. 4, 1991

Related U.S. Application Data

[63] Continuation of Ser. No. 459,336, Dec. 29, 1989, abandoned.

[51] Int. Cl.$^5$ .............................................. B65F 1/08
[52] U.S. Cl. ................................... 294/159; 248/907; 220/23.4; 220/909
[58] Field of Search ............... 294/145, 159, 160, 172, 294/27.1, 32, 87.1; 248/146, 907; 220/1 T, 1 C, 23.2, 23.4, 20, 22

[56] References Cited

U.S. PATENT DOCUMENTS

| | | | |
|---|---|---|---|
| 2,702,641 | 2/1955 | Arthur | 294/87.1 X |
| 3,065,858 | 11/1962 | Furr | 248/907 X |
| 3,080,978 | 3/1963 | Gress | 248/907 X |
| 3,201,075 | 8/1965 | Sievers | 248/146 X |
| 3,279,619 | 10/1966 | Alissandratos | 248/146 X |
| 3,625,370 | 12/1971 | Mintz | 248/907 X |
| 4,736,915 | 4/1988 | Miller et al. | 248/907 X |
| 4,834,253 | 5/1989 | Crine | 220/1 T |
| 4,860,909 | 8/1989 | Leumi | 248/907 X |

FOREIGN PATENT DOCUMENTS

| | | | |
|---|---|---|---|
| 194339 | 9/1986 | European Pat. Off. | 220/1 T |
| 3608031 | 10/1986 | Fed. Rep. of Germany | 220/1 T |

*Primary Examiner*—Margaret A. Focarino
*Assistant Examiner*—Dean J. Kramer
*Attorney, Agent, or Firm*—Dennis H. Lambert

[57] ABSTRACT

A lightweight, compact, compartmented trash receptacle assembly for receiving and holding in different compartments different types of refuse, such as glass, metal, paper, and the like for subsequent disposal, comprises a holder and a plurality of individual trash containers supported on the holder. The holder has a tray-like bottom with an upstanding peripheral flange, and an upstanding support post. A carrying handle is on the upper end of the support post for lifting and carrying the assembly, and spacers are on the tray-like bottom of the holder for engaging the bottom ends of the containers to hold them between the spacers and the peripheral flange. In one form of the invention, hook-like projections on the upper ends of the containers engage in openings at the upper end of the support post, and in another form of the invention, a support post is provided at each of two opposite sides of the holder.

8 Claims, 4 Drawing Sheets

COMPARTMENTED TRASH RECEPTACLE AND HOLDER ASSEMBLY

This is a continuation of copending application Ser. No. 07/459,336 filed on Dec. 29, 1989, now abandoned.

FIELD OF THE INVENTION

This invention relates to containers for holding refuse, and more particularly, to a compartmented trash receptacle assembly for holding different types of refuse in different compartments.

DESCRIPTION OF THE PRIOR ART

Disposal of refuse from homes and businesses is becoming more of a problem as available disposal sites become overburdened. Landfills, where the bulk of such refuse is typically disposed of, are becoming increasingly more selective in the type of materials which will be accepted for disposal. These difficulties are exacerbated by environmental concerns, which by federal and local laws and regulations dictate the type of refuse which can be safely disposed of in existing landfills and incinerators. At least partly because of these problems, but also partly because of purely economic considerations, there is an increasing tendency toward recycling of refuse. Recycling, however, typically requires separation of refuse into different components, i.e., paper, metal, glass, etc.

In order to properly separate refuse into its separate components, it is desirable to provide different receptacles for receiving the components at the point of disposal, since later separation would be burdensome and expensive, if not impossible. In order to meet this need, various compartmented receptacles have been devised in the prior art, including those disclosed in U.S. Pat. Nos. 617,445, 1,021,872, 3,648,875, 3,720,346, 3,856,173, 3,904,218, 4,114,776, 4,660,758, 4,739,894, 4,821,903 and 4,834,253. Some of these devices comprise large bins intended for use at a central disposal site, while others are designed for use in the home. Those receptacles intended for home use also tend to be relatively large and cumbersome, and/or are complicated and expensive in construction, and/or are difficult to use. Many of them provide inner and outer receptacles, with a common lid or cover. The latter designs require opening of all of the receptacles to place refuse in one of the compartments, and the designs in which inner compartments are provided in an outer container are difficult to separate and handle for later disposal of the collected refuse.

Accordingly, there is a need for a simple and economical compartmented trash receptacle for home use to receive the separated components of refuse, and which is compact in design and easy to use.

SUMMARY OF THE INVENTION

It is, therefore, an object of the present invention to provide a compartmented trash receptacle assembly which is simple and economical in construction, compact in design and easy to use.

Another object of the invention is to provide a compartmented trash receptacle assembly which includes a plurality of separate containers supported on a common holder, and in which the assembly is sized to fit beneath a kitchen sink or similar location in the home. A larger form using the same container could be used elsewhere in the kitchen.

A further object of the invention is to provide a trash receptacle assembly which includes a plurality of separate containers for holding different categories of refuse, such as paper, glass, metal, etc., wherein each separate container is relatively small and easy to handle, even when full, and the containers are held assembled together on a common holder.

Yet another object of the invention is to provide a trash receptacle which comprises a plurality of separate containers releasably interengaged on a common holder, with handle means on the holder for lifting all of the containers simultaneously to transport the containers to a disposal site, with each container then being removable from the holder for discharging the contents or the respective containers.

BRIEF DESCRIPTION OF THE DRAWINGS

The foregoing and other objects and advantages of the invention will become apparent from the following detailed description when considered in conjunction with the accompanying drawings, in which like reference characters designate like parts throughout the several views, and wherein.

DETAILED DESCRIPTION OF THE PREFERRED EMBODIMENTS

Figure 2:
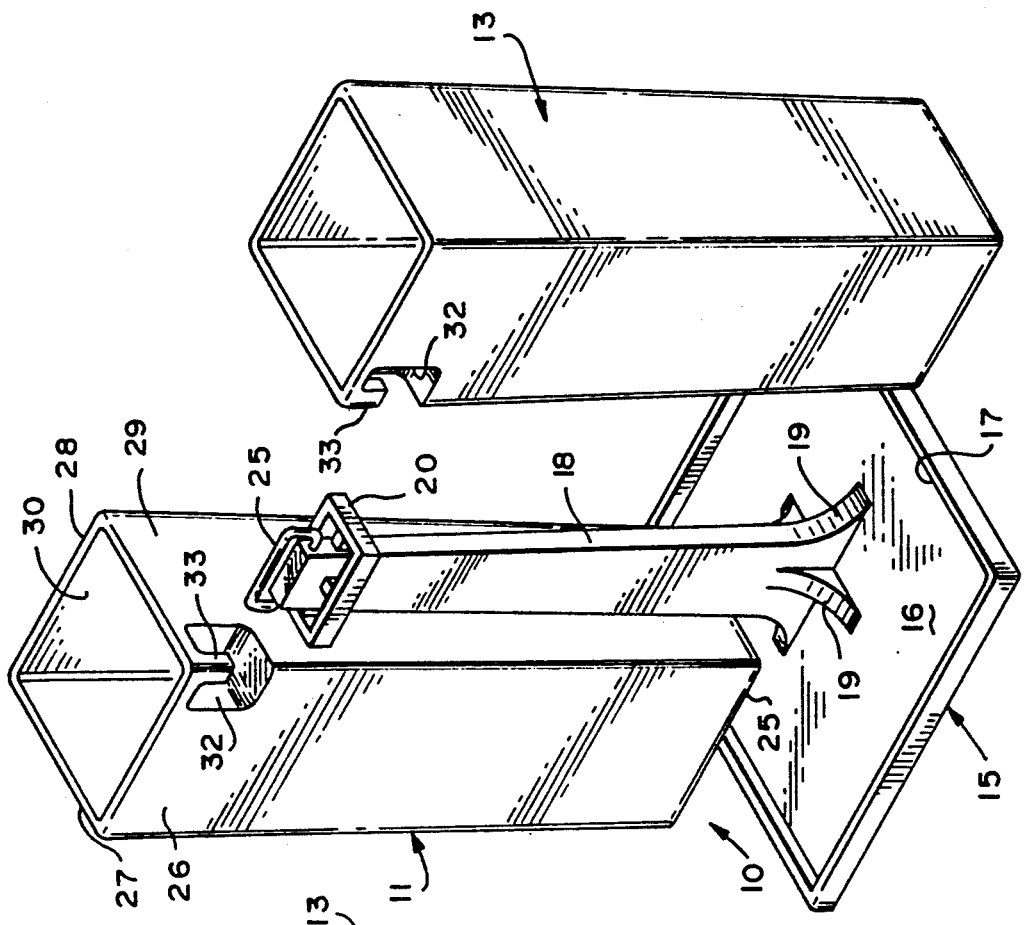
FIG. 2 is a top, exploded perspective view of the first form of the invention, showing two of the containers separated from the holder.
Figure 1:
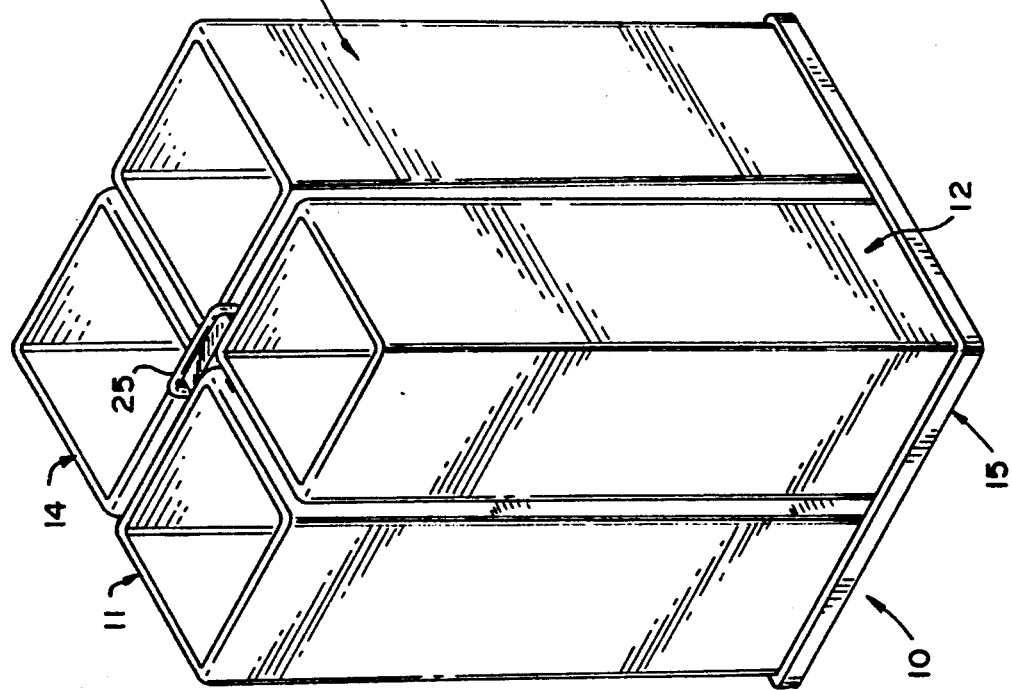
FIG. 1 is a top perspective view of a first form of the invention, wherein four containers are held on a holder.
Figure 4:
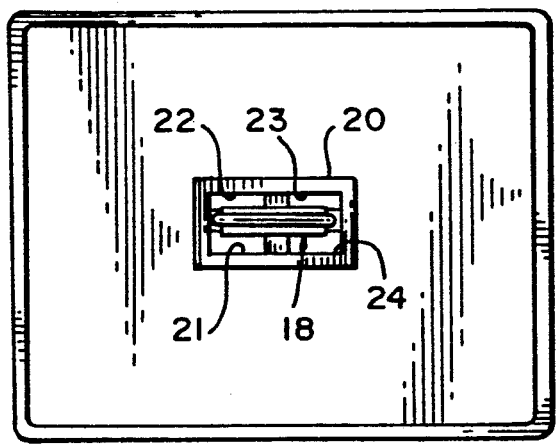
FIG. 4 is a top plan view of the holder of FIG. 3.
Figure 3:
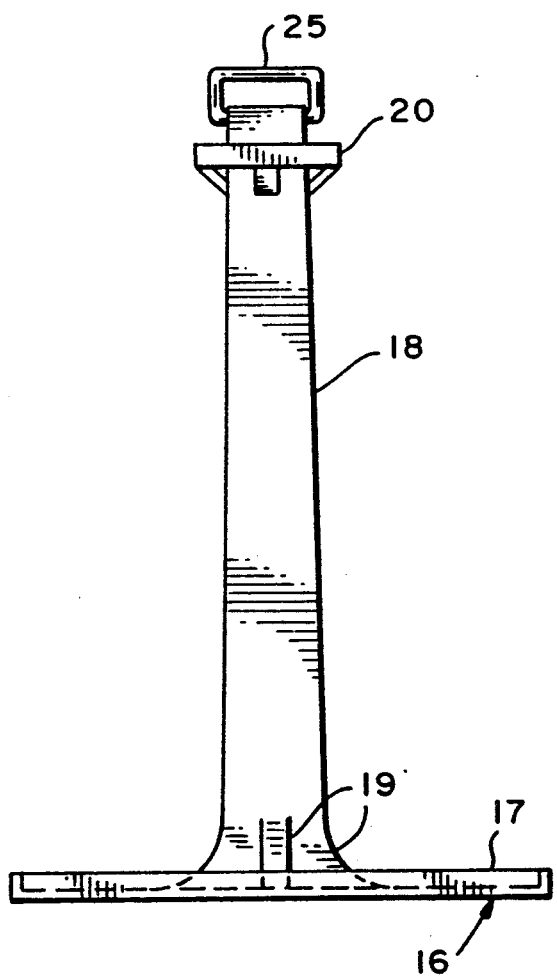
FIG. 3 is an enlarged side view in elevation of the holder of FIG. 1.
Figure 5:
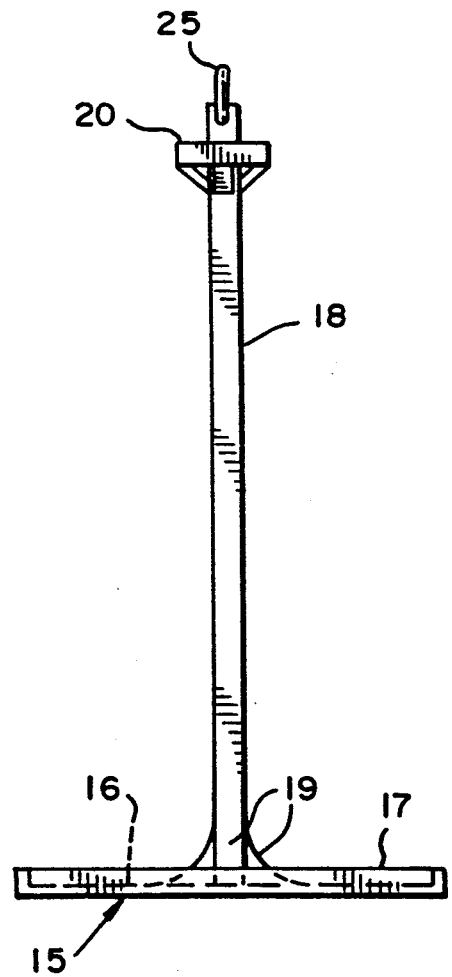
FIG. 5 is an enlarged end view in elevation of the holder of FIG. 3.
Figure 7:
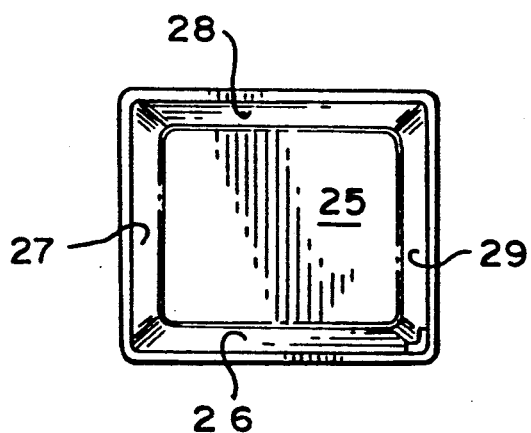
FIG. 7 is a top plan view of the container of FIG. 6.
Figure 6:
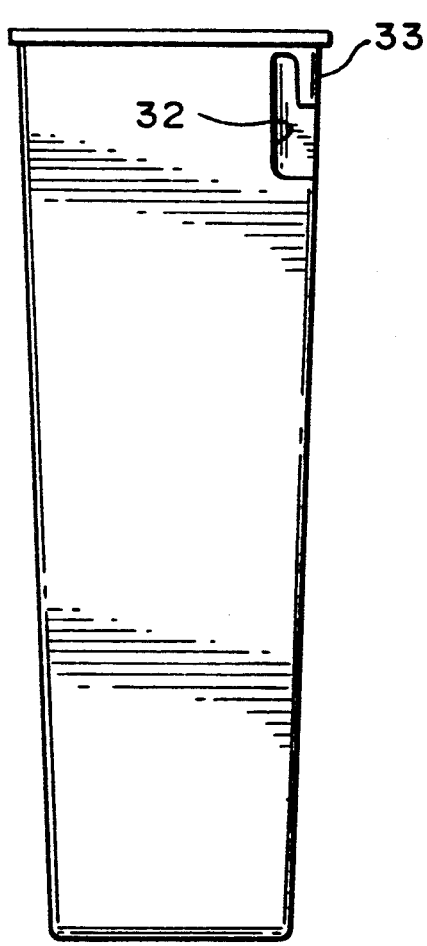
FIG. 6 is an enlarged view in side elevation of one of the containers used in the apparatus of FIG. 1.
Figure 8:
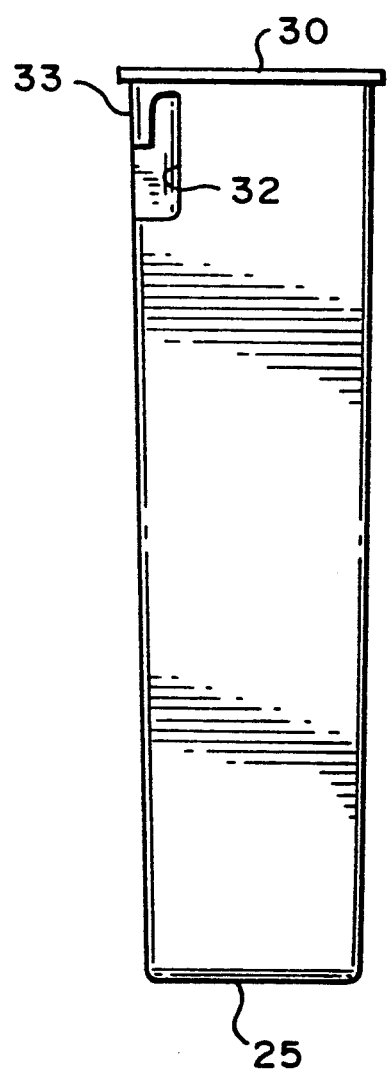
FIG. 8 is an enlarged view in end elevation of the container of FIG. 6.

Referring now more specifically to the drawings, a first form of compartmented trash receptacle assembly in accordance with the invention is represented generally at 10 in FIGS. 1 and 2. This form of the invention includes four separate refuse containers 11, 12, 13 and 14, releasably held on a single holder 15.

The holder 15 comprises a substantially flat, horizontal tray 16 having an upturned flange 17 around its periphery. An elongate, vertical support post 18 extends upwardly from the middle of the tray and has outwardly flared webs 19 on its bottom end which serve to brace the post and also define separators for spacing the bottom ends of the containers.

An annular, rectangularly shaped support ring 20 is provided on the upper end of the post and defines four pockets 20, 22, 23 and 24 spaced around the longitudinal axis of the post.

A handle 25 is attached to the extreme upper end of the post, whereby the holder 15 and any containers supported thereon may be lifted and carried from one location to another.

Each container 11-14 comprises a bottom 26, upstanding side walls 27, 28, 29 and 30, and an open top 31. One corner of each container is formed with a recessed portion 32 and a downwardly projecting hook 33.

In use, the containers 11-14 are placed on the tray, with the bottom ends thereof engaged between the peripheral flange 17 and the webs 19, maintaining the bottoms of the containers firmly seated and equidistantly spaced on the tray. The hooks 33 on the upper corners of the containers are engaged in a respective pocket 21-24 to secure the upper ends of the containers in place adjacent the support post 18. In this way, the holder 15 and containers are locked together to form a unitary assembly that may be lifted and carried by the handle 25.

This assembly may then be placed beneath a kitchen sink or in a similar location and different types of refuse, i.e., glass, paper, metal, etc., placed in the respective containers. When the containers are full, the assembly is lifted and carried to a dumpster or other suitable disposal site, and the individual containers are then lifted and removed from the holder one at a time for emptying their contents.

The holder and containers are made of a suitable lightweight material, such as plastic, and in a preferred form are of a compact size, with the complete assembly measuring only approximately 30 inches high and 20 inches wide, for example. It is thus easily stored beneath a kitchen sink, or in another location in the home, and may be easily picked up and carried. In addition, the interengaged hooks and pockets on the containers and holder, and the nested container bottoms and tray enable the individual containers to be easily removed from the holder so that their contents may be emptied.

If desired, lids (not shown) may be provided for the containers, and wheels or the like (not shown) may be provided on the bottom of the holder to facilitate moving the holder and any containers thereon.

Figure 9:
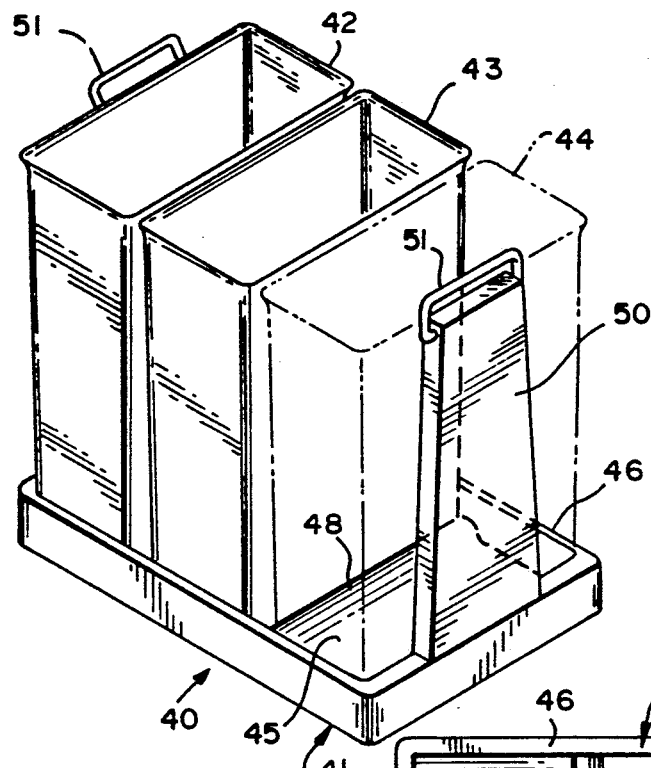
FIG. 9 is a top perspective view, with one container removed, of a second form of the invention.
Figure 12:
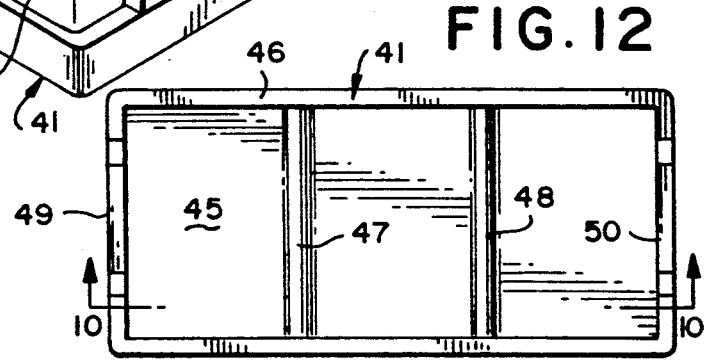
FIG. 12 is a top plan view of the holder of FIG. 9.
Figure 11:
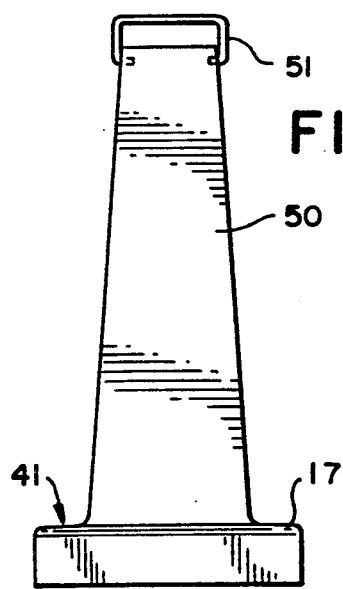
FIG. 11 is an end view in elevation of the holder of FIG. 9.
Figure 10:
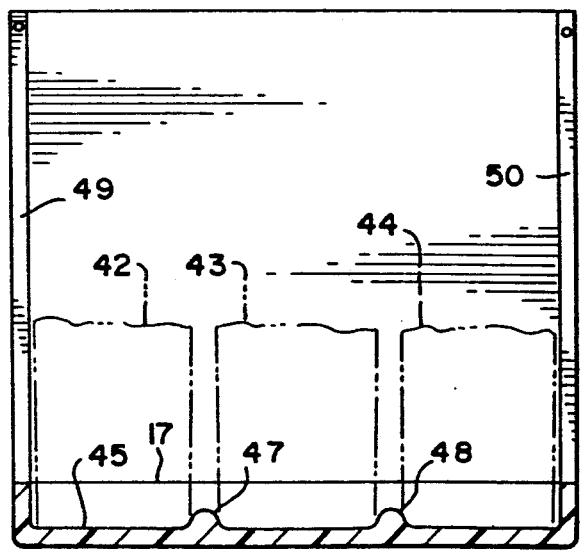
FIG. 10 is an enlarged longitudinal sectional view of the holder of FIG. 9, taken along line 10—10 in FIG. 12.

A modified assembly is referenced generally at 40 in FIG. 9, and comprises a holder 41 with a plurality of separate containers 42, 43 and 44 supported thereon. In this form of the invention, the holder 41 has an elongate base or tray 45 with an upstanding flange 46 around its periphery, and a plurality of separators or spacers 47 and 48 extending transversely across the tray between opposite sides thereof. A pair of upstanding end support posts 49 and 50 are formed on opposite ends of the tray and project upwardly therefrom at a slightly outwardly flared angle. A carrying handle 51 is provided on the upper end of each support post so that the holder and any containers thereon may be picked up and carried.

In use, three separate containers 42-43 are placed on the holder, with their bottom ends engaged between the sides of the tray and the spacers 47 and 48. The upper ends are maintained in stable position by the upstanding support posts 49 and 50.

The holder 41 and containers 42-43 in this form of the invention are also preferably made of a lightweight plastic material, or the like, and the assembly is compact in design, having overall dimensions of only about 9 inches wide, 20 inches long and 18 inches high. It may thus be easily stored beneath a kitchen sink or the like and may be easily lifted and carried from one location to another.

As in the previously described form of the invention, lids or covers (not shown) and wheels (not shown) may also be provided in this form of the invention.

Although the invention has been described with reference to particular embodiments, it is to be understood that these embodiments are merely illustrative of the application of the principles of the invention. Numerous modifications may be made therein and other arrangements may be devised without departing from the spirit and scope of the invention.

I claim:

1. A lightweight, unitary, compartmented trash receptacle assembly for receiving and holding a different compartments different kinds of refuse, such as glass, paper, metal and the like, and which may be stored in a small space and lifted and carried from one location to another, comprising:

a plurality of individual trash containers each having a closed bottom, upstanding side walls and an open top end with retaining means thereon, said containers being adapted to receive and hold different kinds of refuse, whereby refuse may be separated into different types, such as glass, paper, metal, and the like, for subsequent disposal, each container having shaped retaining means on the top end thereof;

a lightweight holder for releasably holding said containers in a unitary assembly, said holder having a bottom wall shaped as a shallow tray with an upstanding peripheral flange extending around an outer margin thereof and of a size to encircle the bottoms of the containers and confine them within the space bounded by the peripheral flange;

a support post projecting upwardly from the center of the tray, said support post having an annular support ring on the upper end thereof, defining four openings spaced equidistantly around the post;

said shaped retaining means on the containers comprising a downwardly protruding hook on the upper end of each container adapted to extend into a respective opening in the support ring to secure the upper ends of the containers in position adjacent the support post;

spacer means upstanding from the bottom wall of the tray for engaging one side of the respective container bottoms while the other side of the respective container bottoms is engaged against an inner surface of said peripheral flange, whereby said container bottoms are maintained in spaced relationship to one another and are held engaged between the spacer means and the encircling peripheral flange, said spacer means comprising a plurality of webs extending outwardly from the bottom of the support post along the surface of the tray toward adjacent sides of the tray, dividing the tray into four quadrants for receiving respective containers; and handle means on the upper end of said support post means for lifting and carrying the holder and any containers held thereon.

2. A trash receptacle assembly as claimed in claim 1, wherein:

said holder and containers are made of lightweight plastic material.

3. A trash receptacle assembly as claimed in claim 2, wherein:

said assembly has a height of approximately 30 inches, and a maximum width of approximately 20 inches.

4. A lightweight, unitary, compartmented trash receptacle assembly for receiving and holding in different compartments different kinds of refuse, such as glass, paper, metal and the like, and which may be stored in a small space and lifted and carried from one location to another, comprising:
- a plurality of individual trash containers each having a closed bottom, upstanding side walls and an open top end, said containers being adapted to receive and hold different kinds of refuse, whereby refuse may be separated into different types, such as glass, paper, metal, and the like, for subsequent disposal, each container being generally rectangularly shaped in transverse cross-section;
- a lightweight holder for releasably holding said containers in a unitary assembly, said holder having a rectangularly shaped bottom wall with an upstanding peripheral flange extending therearound defining a shallow tray for receiving and confining the bottom ends of the containers in encircling relation thereto, and a plurality of spaced apart, upstanding spacer means extending transversely across the bottom wall for engaging and maintaining in spaced relationship the bottom ends of containers supported on the bottom wall, said peripheral flange and spacer means being related to one another and to the containers such that the bottom ends of the containers are held engaged between the spacer means and the encircling peripheral flange, as upstanding support post projection upwardly from each of the two opposite sides of the bottom of the tray, said spacer means comprising a plurality of elongate, raised ribs extending transversely across the tray in equidistantly spaced relationship between the support posts;
- handle means on the upper end of said support post for lifting and carrying the holder and any containers held thereon.

5. A trash receptacle assembly as claimed in claim 4, wherein:
said holder and containers are made of lightweight plastic material.

6. A trash receptacle assembly as claimed in claim 5, wherein:
said assembly has a height of approximately 18 inches, and a maximum width of approximately 20 inches.

7. A lightweight, unitary, compartmented trash receptacle assembly for receiving and holding a different compartments different kinds of refuse, such as glass, paper, metal and the like, and which may be stored in a small space and lifted and carried from one location to another, comprising:
- a plurality of individual trash containers each being generally rectangular in transverse cross-section and having a closed bottom, upstanding side walls and an open top end with retaining means thereon, said containers being adapted to receive and hold different kinds of refuse, whereby refuse may be separated into different types, such as glass, paper, metal, and the like, for subsequent disposable, each container having a downwardly projecting hook means in one corner of the upper end thereof, with the side wall of the container being recessed inwardly at the location of the hook means so that the hook means is located generally within the space bounded by the side walls of the container;
- a lightweight holder for releasably holding said containers in a unitary assembly, said holder having a bottom wall shaped as a shallow tray with an upstanding peripheral flange extending around an outer margin thereof and of a size to encircle the bottoms of the containers and confine them within the space bounded by the peripheral flange;
- support post means projecting upwardly from the tray;
- securing means on the upper end of the support post means for cooperation with the hook means on the containers to hold the upper ends of the containers in place on the holder, said securing means comprising a recess for receiving the hook means;
- spacer means upstanding from the bottom wall of the tray for engaging one side of the respective container bottoms while the other side of the respective container bottoms is engaged against an inner surface of said peripheral flange, whereby said container bottoms are maintained in spaced relationship to one another and are held engaged between the spacer means and the encircling peripheral flange; and
- handle means on the upper end of said support post means for lifting and carrying the holder and any containers held thereon.

8. A trash receptacle assembly as claimed in claim 7, wherein:
the securing means on the post comprises an annular ring of generally rectangular configuration in plan view, on the upper end of the post means, and sized and shaped complementally to the hook means on the containers so that the ring means fits within the recessed areas at the corners of the containers, with the hook means extending downwardly into the ring means.

* * * * *